(12) United States Patent
Kambhatla

(10) Patent No.: US 10,547,896 B2
(45) Date of Patent: Jan. 28, 2020

(54) TECHNIQUES FOR COMMUNICATING DISPLAY STREAMS

(71) Applicant: Intel Corporation, Santa Clara, CA (US)

(72) Inventor: Srikanth Kambhatla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/692,535

(22) Filed: Apr. 21, 2015

(65) Prior Publication Data

US 2016/0316259 A1 Oct. 27, 2016

(51) Int. Cl.
| | |
|---|---|
| *H04N 21/4363* | (2011.01) |
| *H04N 21/41* | (2011.01) |
| *H04N 21/45* | (2011.01) |
| *H04N 21/442* | (2011.01) |

(52) U.S. Cl.
CPC ... *H04N 21/43637* (2013.01); *H04N 21/4122* (2013.01); *H04N 21/44227* (2013.01); *H04N 21/4516* (2013.01)

(58) Field of Classification Search
CPC .......... H04L 12/5825; H04L 29/06489; H04N 21/2355; H04N 21/25825; H04N 21/2662; H04N 21/43637; H04N 21/43615; H04N 21/44227; H04N 21/4516; H04N 21/4122; H04W 8/22; G06F 3/1423; G06F 3/1454; G09G 2370/042; G09G 2370/16; G09G 2370/047; G09G 2356/00; G09G 2340/0442

See application file for complete search history.

(56) References Cited

U.S. PATENT DOCUMENTS

| | | | |
|---|---|---|---|
| 8,984,155 B2 | 3/2015 | Kambhatla | |
| 2010/0183004 A1* | 7/2010 | Kobayashi | G06F 13/385 370/389 |
| 2011/0061070 A1 | 3/2011 | Oh et al. | |
| 2011/0304522 A1* | 12/2011 | Zeng | G09G 5/006 345/1.1 |
| 2013/0028144 A1* | 1/2013 | Goodman | H04L 12/66 370/259 |
| 2013/0223539 A1 | 8/2013 | Lee et al. | |
| 2013/0265487 A1* | 10/2013 | Yu | H04N 9/12 348/383 |
| 2014/0269757 A1* | 9/2014 | Park | H04L 49/201 370/432 |
| 2014/0306865 A1 | 10/2014 | Pan et al. | |

(Continued)

OTHER PUBLICATIONS

International Search Report and Written Opinion received for PCT Patent Application No. PCT/US2016/023458, dated Jul. 21, 2016, 13 pages.

*Primary Examiner* — Benjamin R Bruckart
*Assistant Examiner* — Akshay Doshi

(57) ABSTRACT

Various embodiments are generally directed to an apparatus, method and other techniques to discover at least one sink device and at least two or more display devices, and determine capabilities for each of the two or more display devices, perform a configuration for the at least one sink device and the two or more display devices to present a display stream on the two or more display devices, and wirelessly communicate the display stream for presentation on the two or more display devices.

19 Claims, 9 Drawing Sheets

(56) References Cited

U.S. PATENT DOCUMENTS

| | | | | |
|---|---|---|---|---|
| 2015/0172757 A1* | 6/2015 | Kafle | ................... | H04L 67/1044 |
| | | | | 725/81 |
| 2015/0319485 A1 | 11/2015 | Vedula et al. | | |
| 2016/0019018 A1* | 1/2016 | Xiong | ................... | G06F 3/1446 |
| | | | | 345/1.3 |
| 2016/0132822 A1* | 5/2016 | Swafford | .............. | H04W 4/008 |
| | | | | 705/28 |
| 2016/0192419 A1* | 6/2016 | Lee | ....................... | H04W 48/16 |
| | | | | 370/329 |

\* cited by examiner

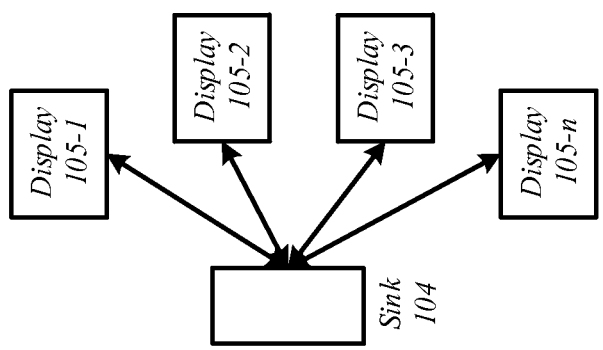
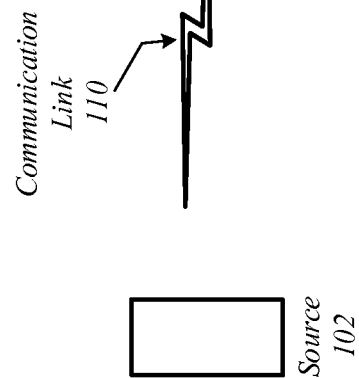
FIG. 1A

500

```
┌─────────────────────────────────────────────────┐
│ DISCOVER AT LEAST ONE SINK DEVICE AND AT LEAST TWO │
│    OR MORE DISPLAY DEVICES, AND DETERMINE        │
│ CAPABILITIES FOR EACH OF THE TWO OR MORE DISPLAY │
│                    DEVICES                       │
│                      505                         │
└─────────────────────────────────────────────────┘
                        │
┌─────────────────────────────────────────────────┐
│  PERFORM A CONFIGURATION FOR THE AT LEAST ONE SINK │
│   DEVICE AND THE TWO OR MORE DISPLAY DEVICES TO  │
│    PRESENT A DISPLAY STREAM ON THE TWO OR MORE   │
│                 DISPLAY DEVICES                  │
│                       510                        │
└─────────────────────────────────────────────────┘
                        │
┌─────────────────────────────────────────────────┐
│   WIRELESSLY COMMUNICATE THE DISPLAY STREAM FOR  │
│  PRESENTATION ON THE TWO OR MORE DISPLAY DEVICES │
│                       515                        │
└─────────────────────────────────────────────────┘
```

*FIG. 5*

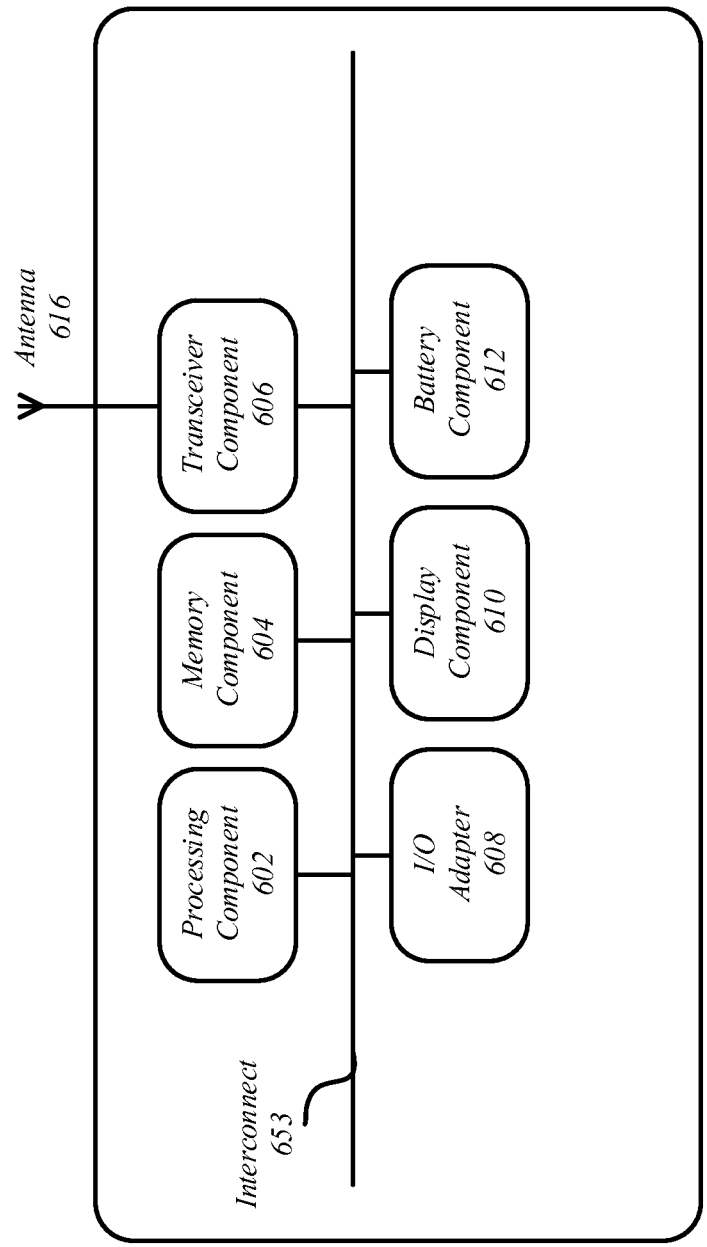

TECHNIQUES FOR COMMUNICATING DISPLAY STREAMS

TECHNICAL FIELD

Embodiments described herein generally relate techniques to communicate at least one display stream to two or more display devices.

BACKGROUND

The popularity of mobile devices has led to wide use of wirelessly streaming content such as online videos, movies, games and web pages from mobile devices to external high definition displays. Further, several wireless technologies have been developed for securely and wirelessly sending video and audio from a source device to a remote display device. Examples of proprietary technologies include WiDi® developed by Intel® Corporation, and AirPlay® developed by Apple® Inc. In an effort to provide an open standard, the Wi-Fi Alliance (WFA) has developed the Miracast® standard, which uses Wi-Fi Direct® interconnect supported devices without the need for a wireless access point. These technologies are generally directed to communicating digital video scene captures between two devices, a source device and a sink device. More specifically, the source device may act as a transmitter and transmit the digital video scene captures in real-time to the sink device acting as the receiver. The digital video scene captures may be communicated via one or more wireless local area network connections.

BRIEF DESCRIPTION OF THE DRAWINGS

FIG. 1A illustrates an example embodiment of a computing system.

FIG. 5 illustrates an example embodiment of a second logic flow.

FIG. 6 illustrates an example embodiment of a computing device.

DETAILED DESCRIPTION

Figure 1B:
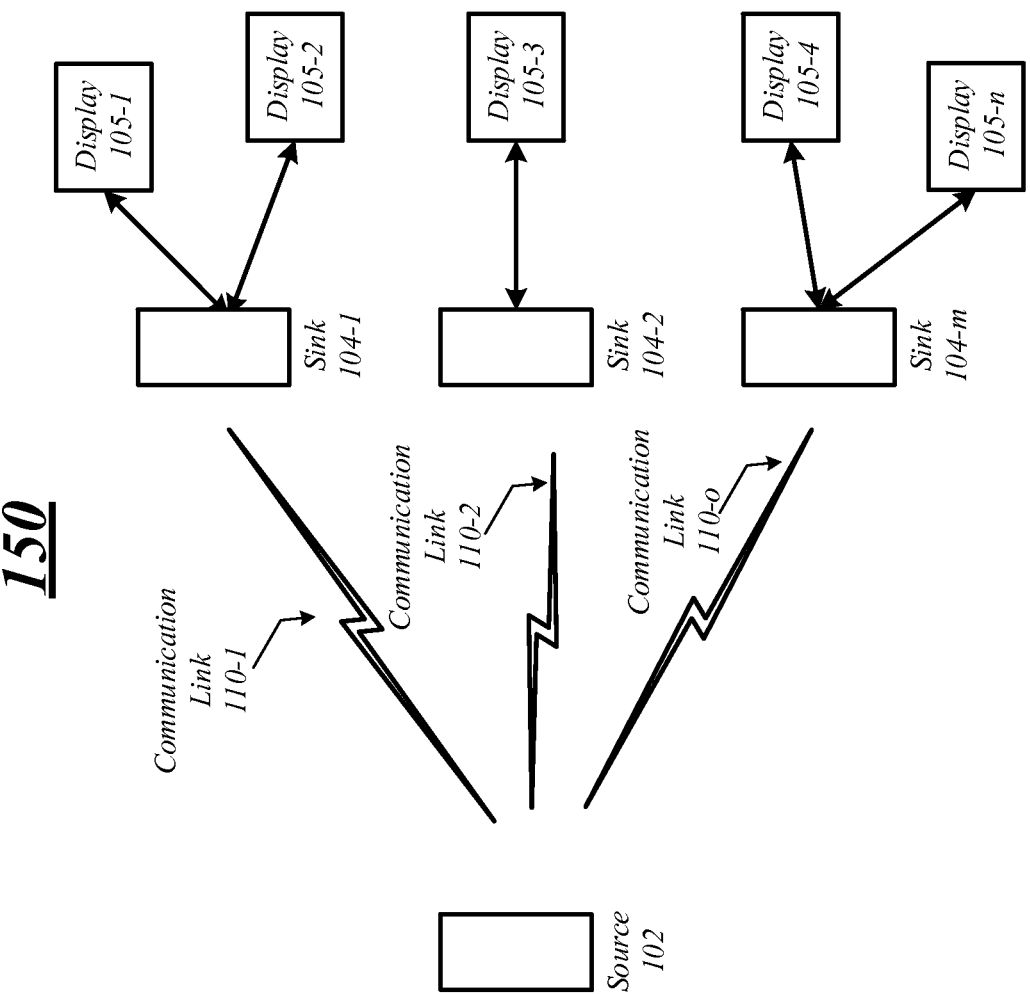
FIG. 1B illustrates an example embodiment of a second computing system.

Various embodiments may be generally directed to wirelessly communicating display streams between devices. For example, one or more embodiments, may include communicating a display stream from a source device to one or more sink devices coupled with display devices. The display stream may include a plurality of frames having information to present display scenes on the display devices. For example, the display devices may receive the display stream via the sink devices and may present the display scenes.

Further, embodiments may include performing a discovery operation to detect the one or more sink devices and displays devices to present display streams. The discovery operation may include communicating one or more messages, requests, responses and so forth between a source device and sink devices. As will become more apparent in the following description, the messages, requests and responses may include information about the devices, including the source device, the sink devices, and the display devices. The information may include capabilities and parameter information for the devices.

Embodiments may also including performing a configuration such that the sink devices and displays device are properly configured to receive and present one or more display streams. For example, the configuration may including grouping the display devices into one or more groups, such that each group can receive and present at least one display stream. In addition, the configuration may including binding the display devices including determining a relative position of each of the display devices in a group, for example. This relative position information may then be used when presenting the display stream on the display devices as will be discussed in more detail below.

Various embodiments may also including monitoring for the addition or removal of display devices and performing various configuration changes to compensate for these configuration changes. For example, the output of a display stream may be updated based upon the addition or removal of a display device to a group receiving the display stream. These and other details will become more apparent with the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the contemplated method. Examples of the contemplated structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an example embodiment of a computing system 100 capable of communicating display streams among multiple devices. Although FIG. 1 illustrates computing system 100 having a limited number of a devices, various embodiments are not limited in this manner. In embodiments, computing system 100 may include a source device 102 and a sink device 104 to communicate one or more display streams to present on a display device, such as display devices 105-1 through 105-n, where n may be any positive integer. In some embodiments and as will be explained in more detail below, the source device 102 may communicate one or more display streams wirelessly via communications link 110. The display streams may be communicated in accordance with one or standards, such as one or more of the Institute of Electrical and Electronics Engineers (IEEE) 802.11 standards for wireless local area networks (WLANs), for example IEEE 802.11-2012 Revision of IEEE Standard 802.11-2007, Mar. 29, 2012 also including any amendments or variants (hereinafter "IEEE 802.11 Standards"). In addition, the computing system 100 may operate in accordance with any of one or more Wi-Fi display standards or variants thereof, such as those defined by the Wi-Fi Display Technical Specification v1.0.0 known as Miracast® (hereinafter "Wi-Fi Display Standards") by the Wi-Fi Alliance groups. Various embodiments are not limited in this manner.

Computing system 100 may include a source device 102 which can be any type of device capable of communicating display information including one or more video or display streams. For example, the source device 102 can include a personal digital assistant, a smart phone, a cellular telephone, a handset, a one-way pager, a two-way pager, a messaging device, a computer, a laptop computer, a notebook computer, a handheld computer, a tablet computer, an electronic-reader, a network appliance, a web appliance, multiprocessor systems, processor-based systems, an access point, a television, a flat-screen television, a set-top box, a gaming system, a video streaming device, or any combination thereof. Furthermore, the source device 102 may be mobile computing device. Various embodiments are not limited in this manner.

Similarly, the sink device 104 may be any type of device capable of communicating display information including one or more video or display streams. For example, a sink device 104 may receive display streams from a source device 102 and include a personal digital assistant, a smart phone, a cellular telephone, a handset, a one-way pager, a two-way pager, a messaging device, a computer, a laptop computer, a notebook computer, a handheld computer, a tablet computer, an electronic-reader, a network appliance, a web appliance, multiprocessor systems, processor-based systems, an access point, a television, a flat-screen television, a set-top box, a gaming system, a video streaming device, or any combination thereof. Furthermore and in some embodiments, the sink device 104 may be dongle having circuitry to receive, process, and communicate the display streams. The dongle may be capable of being plugged into another device, such as one or more the devices discussed above.

In some embodiments, the source device 102 and the sink device 104 may communicate over one or more wireless connections, such as communication link 110. Communication link 110 may be any type of link including a wireless link and is capable of communicating information via one or more standards. For example, source device 102 may communicate over the communication link 110 with a sink device 104 in accordance with one or more of the IEEE 802.11 Standards and the Wi-Fi Display Standards. Various embodiments are not limited in this manner.

In embodiments, the sink device 104 may be coupled with and/or connected to one or more display devices, such as display device 105-1 through 105-n. The sink device 104 may be coupled with the display devices 105 though any type of connection, such as a such as a High-Definition Multimedia Interface (HDMI) connection, a Video Graphics Array (VGA) connection, a Universal Serial Bus (USB) connection, a serial connection, a parallel connection, and so forth. Various embodiments are not limited in this manner. Furthermore, the sink device 104 may include a display device 105. For example, the sink device 104 may be a tablet or notebook computing device and the display device 105 may be co-located within the same housing. In this example, the source device may communicate the display stream to the sink device 104 for presentation on the display device 105 of the tablet or computing device.

The display devices 105 may be any type of device capable of displaying or presenting information. For example, a display device 105 may include an electronic visual display, a flat panel display, a liquid crystal display, a television display, a computer monitor display, a cathode ray tube (CRT) display, a light-emitting diode (LED) display, a electroluminescent (ELD) display, an electronic paper (E-INK) display, a plasma display panel (PDP), an organic LED (O-LED) display, and so forth.

As will be discussed in more detail below, the source device 102 may communicate one or more display streams to one or more sink devices 104 which may be displayed on one or more display devices 105. A display stream may include one or more frames including display information that may be presented on the display devices 105 and audio information that may be presented through one or more speakers, for example. More specifically, a frame may include display information including pixel information to present a display scene or at least a portion of a display scene on a display device. A display scene may be a visual presentation typically presented on display devices. In some embodiments, a display scene may include a frame in video stream, a graphical user interface (GUI), a window, or any other type of display capable of being displayed on a display device.

In some embodiments, the computing system 100 may operate in an extended display mode or a cloned mode. For example, a display stream may be communicated to a sink device 104 which may present a display scene "stretched" across multiple display devices when operating in an extended mode of operation. In another example, a display stream may be communicated to a sink device 104 which may present an entire display scene cloned on multiple displays in the cloned mode of operation. Various embodiments are not limited in this manner.

FIG. 1B illustrates another example embodiment of a computing system 150 capable of communicating display streams among multiple devices. Although FIG. 1B illustrates computing system 150 having a limited number of a devices, various embodiments are not limited in this manner. In embodiments, computing system 150 may include a source device 102 and two or more sink devices 104-1 through 104-m, where m may be any positive integer. In embodiments, the source device 102 may communicate one or more display streams to the sink devices 104 for presentation on display devices 105. The source device 102 may communicate the display streams wirelessly via communication links 110-1 through 110-o, where o may be any positive integer, and in accordance with one or more standards, such as one or more of the IEEE 802.11 Standards and the Wi-Fi Display Standards.

Computing system 150 may include a source device 102 which can be any type of device capable of communicating display streams as previously discussed above. Similarly, the sink devices 104 may be any type of device capable of communicating display streams and may be coupled with or connected to the one or display devices 105. In some embodiments, a source device 102 may send display streams and sink devices 104 may receive display streams. However, embodiments are not limited in this manner.

In some embodiments, the source device 102 may communicate one or more display streams over the communication links 110 to the sink devices 104 for presentation on the displays 105. Further and as will discussed in more detail below, the display streams may be communicated to multiple sink devices 104 for presentation on the display devices 105. For example, a display stream may be communicated to sink device 104-1 for presentation on display devices 105-1 and 105-2. The display stream also may be communicated to sink device 104-2 for presentation on display device 105-3. Various embodiments are not limited in this manner and a display stream may be communicated to any combination of sink devices 104 and display devices 105 for presentation. In some embodiments, the source device 102 may communicate multiple display streams to sink devices 104 for presentation on any combination of display devices 105, for example.

Further and as similarly discussed above, any number of sink devices 104 may include the display device 105 within the same housing. For example, the sink devices 104 may be a tablet or a notebook computer and the display streams may be presented on the display devices 105 of the tablet or notebook computer. Various embodiments are not limited in this manner.

Figure 2:
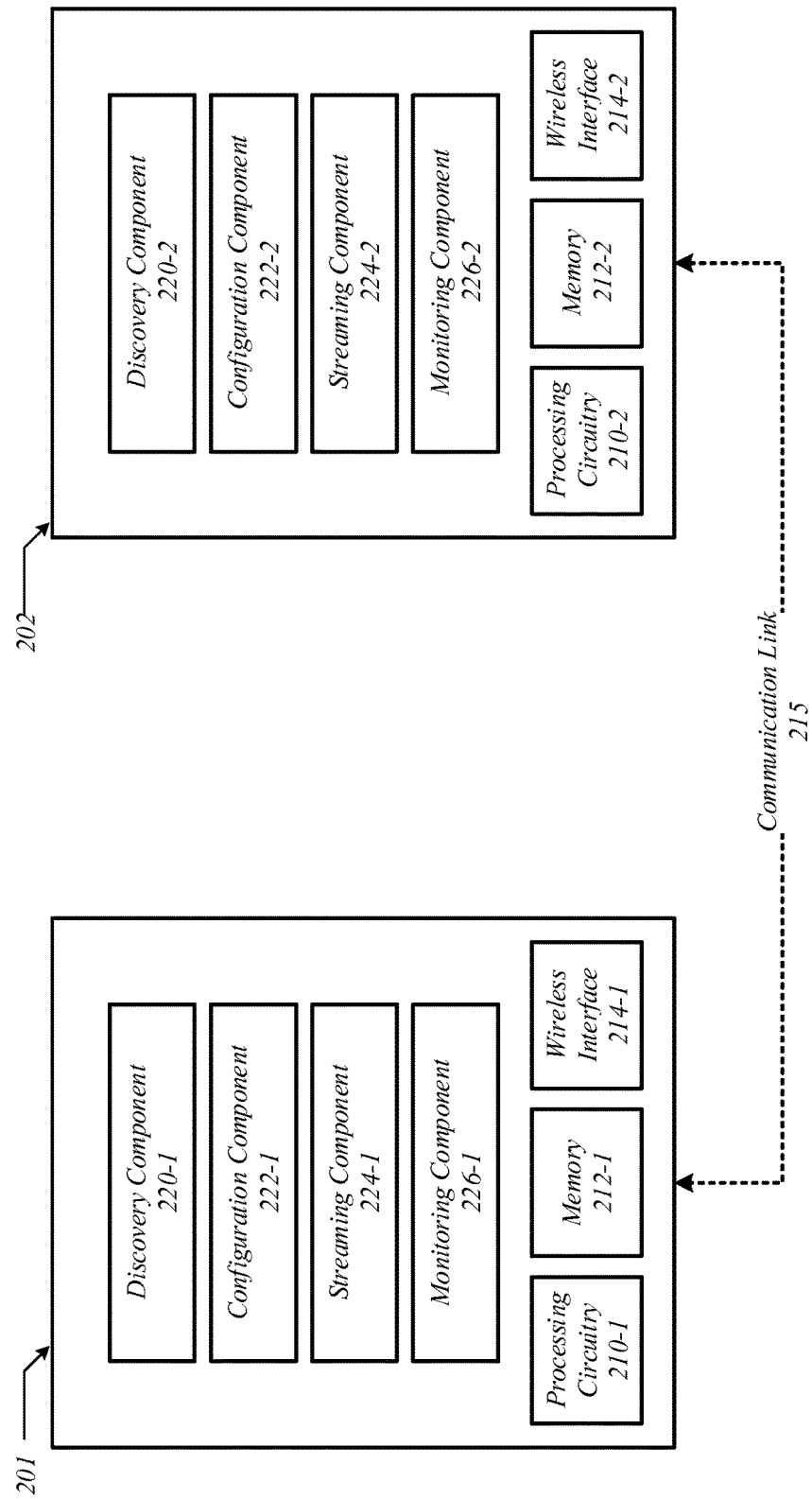
FIG. 2 illustrates an example embodiment of a third computing system.

FIG. 2 illustrates an example embodiment of a computing system 200 to communicate display streams. Computing system 200 may include computing devices 201 and 202 communicating via a communication link 215. In some embodiments, computing device 201 may be a source device and computing device 202 may be a sink device which may be coupled with one or more display devices (not shown). In some embodiments, the computing device 201 may communicate one or more display streams to computing device 202 via communication link 215 and in accordance with one or more standards, such as the 802.11 Standards and the Wi-Fi Display Standards.

The computing devices 201 and 202 may include processing circuitry 210, memory 212, and a wireless interface 214. Various embodiments are not limited in this manner and computing devices 201 and 202 may include more or less circuitry, devices, components, and so forth. In addition, computing devices 201 and 202 may include a discovery component 220, a configuration component 222, a streaming component 224, and a monitoring component 226. The components may be implemented in software only, hardware only, or combination thereof. For example, one or more of the components may be at least partially implemented as software in a device driver. In another example, one or more of the components may be at least partially implemented in hardware as part of firmware in a circuit. Various embodiments are not limited in this manner.

In embodiments, the circuitry 210 may include may include one or more processors, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 201 may, for example, process data and information for transmission between devices 201 and 202.

Each of the computing devices 201 and 202 may also include a memory unit 212 which may be, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Memory unit 212 may store data received and/or store data intended for transmission. Further, memory unit 212 may store one or more instructions for carrying out the operation of station 201 and 202 including various embodiments disclosed herein. In some embodiments, memory unit 212 may be a non-transitory storage medium. Various embodiments are not limited in this manner.

The computing devices 201 and 202 may also include a wireless interface 214 to communicate information and data with other devices over communication link 215, for example. The wireless interface 214 may include circuitry for transmission and reception of information in packet and/or frames, for example. For example, the wireless interface 214 may include a transceiver coupled with an antenna (not shown) capable of communicating information and data. The computing devices 201 and 202 may include more than one wireless interface 214, each capable of communicating via different communication standards and protocols. For example, a wireless device 214 may be a Wi-Fi communication device, a Bluetooth communication device, a peer-to-peer (P2P) communication device, and so forth. Further, the wireless interface 214 may be capable of communicating via one or more standards, such as the 802.11 Standards and the Wi-Fi Display Standards. Various embodiments are not limited in this manner.

Computing devices 201 and 202 can also include a discovery component 220 capable of discovering one or more other devices, such as sink devices and display devices. In some embodiments, the discovery component 220 may be stored in memory 212 and can be operative and/or at least partially implemented in circuitry 210 to discover other devices and capabilities of the other devices. The discovery component 220 on a source device may communicate a probe request and/or a beacon message as a broadcast message to discover other devices, such as sink devices and display devices. The discovery component 220 may receive a probe response and/or a beacon response message having information identifying other devices. In some embodiments, the response message may be received from a sink device and include information identifying one or more display devices coupled to the sink device. For example, the discovery component 220 on a source device may communicate a discovery beacon and/or probe request which may be received by a sink device. The sink device may communicate a response including information identifying itself and display devices that are coupled with the sink device including a port associated with each of its display devices. In embodiments, the discovery component 220 may discover any number of sink devices and display devices in this manner.

In embodiments, the discovery component 220 on the source device may generate or assign an address tuple to identified a sink device and a display device to receive each frame of the display stream. For example, the tuple may be in the form (sink_address, display_address), where sink_address identifies a sink device to receive a frame and display_address identifies a display device coupled with the sink device to receive the frame. Each display device may be assigned a unique address which may be communicated to the operating system for use when streaming the display stream. Various embodiments are not limited in this manner. For example, display devices may communicate directly with a source device communicating the beacon or probe request.

In embodiments, the discovery component 220 may determine the capabilities of sink devices and display devices. For example, a response from a sink device may include information identifying capability information, including the number of display devices coupled with a sink device, and an address (or port) for each display device.

In some embodiments, the discovery component 220 may receive enhanced extended display identification data (E-EDID) identifying the capabilities of each display device to receive display streams. The capabilities may include one or more of a display device type, display device identification, a filter type, timing support, a display size, luminance data, and pixel mapping information, and so forth. Various embodiments are not limited in this manner and other information may be included in the E-EDID data. As will be discussed in more detail below, the capability information may be used when configuring and streaming one or more display streams. In some embodiments, the E-EDID data may be determined by the discovery component 220 on the source device via one or more real-time session protocol (RTSP) messages, such as a multiple display E-EDID message, for example a "wfd-multiple-display-edid" message used with an RTSP M3 request and response. The new message may allow for specification of a port number for each display device that is be polled.

In embodiments, the computing devices 201 and 202 may include a configuration component 222 which may be stored in memory 212 and operative and/or at least partially implemented in circuitry 210 to perform a configuration to communicate at least one display stream. Various parts of a configuration including grouping and binding may be performed by the configuration component 222 on a source device and/or a sink device. The configuration may include grouping and binding one or more display devices to present the display stream. The configuration component 222 may group and bind any number of display devices coupled with any number of sink devices.

Moreover, the configuration component 222 may group and bind while operative on a source device and/or sink device. For example, a configuration component 222 operative on a source device may group display devices, and a configuration component 222 operative on a sink device may bind the display devices, or vice versa. In another example, a configuration component 222 operative on the source device may group and bind the display devices. In a third example, a configuration component 222 on a sink device may group and bind display devices, including display devices coupled with other sink devices. If a sink device groups and/or binds display devices, the sink device may communicate grouping and/or binding information to a source device for streaming one or more display streams.

In embodiments, the configuration component 222 may group one or more display device by selecting the display devices to present a display stream. For example, various embodiments may include a computing system having a number of different sink devices and a number of display devices, a configuration component 222 may select a particular number of display devices to present a display stream which may be a subset of a total number of display devices. More specifically, if the total number of display devices in a system is four, the configuration component 222 may select two display devices to present a display stream. Various embodiments are not limited to this example and in some embodiments, a total number of display devices may be selected to present a display stream, for example.

In some embodiments, the configuration component 222 may group display devices based on a user selection. For example, one or more of the computing devices 201 and 202 may include a display capable of displaying a graphical user interface and an input device to receive user inputs. In this example, a user may select which display devices to present a display stream. The selection may also be based on information, such as the capability information, as previously discussed. In some embodiments, the configuration component 222 may include logic which may pick or select display devices to present a display stream based on capabilities, for example.

In some embodiments, a configuration component 222 may bind or configure display devices. For example, the configuration component 222 may bind display devices by configuring a display resolution for each display device in a group, determining which portion of a display scene to send to a particular display device in a group, and determining relative locations of each display device in a group. More specifically, the configuration component 222 may configure a display resolution for each display device based on the E-EDID data indicating display resolutions supported by a display device, for example. Thus, frames sent to display devices may have the proper display resolution for presentation.

Further, a configuration component 222 may determine which portions of a display scene to send to particular display devices based on relative positions or locations of the display devices when binding the display devices. For example, when operating in extended mode, a configuration component 222 may communicate an upper portion of a display scene to a display device relatively positioned above another display device and a lower portion of a display scene to a display device relatively positioned below the display device. The number of portions of display scene may be determined or directly correspond with a number of display devices in a group. In some embodiments, the configuration component 222 may send an entire display scene to one or more display devices when operating in cloned mode. In other words, each display device in a group may receive and display the same display scene to a user.

As mentioned, the configuration component 222 may determine relative positions of each display device in a group when binding the display devices. The relative position of a display device may be its location relative to all other display devices in the group. In some embodiments, the relative position for a display device may be determined by a user via a user interface. In another example, the relative position may be determined by the configuration component 222 based on location and orientation information received from the display devices in a group. For example a configuration component 222 may receive a location of a display device determined via a location determination device using such techniques as global positioning, or triangulation. The configuration component 222 may also receive orientation information for each display device determined via a gyro sensor or any other type of orientation determination device. The configuration component 222 can use this information and information from other display devices to determine relative positions of each display device and determine which portions of a display scene to communicate to a particular display device. Various embodiments are not limited to these examples.

In some embodiments, the configuration component 222 may generate and bind more than one group of display devices. For example, the configuration component 222 may generate two groups each having two or more display devices. Further, each group and associated display devices may receive a different or same display stream for presentation. In some embodiments, if more than one group is generated a particular display device may only be assigned or associated with one group. However, in the same or other embodiments a display device may be assigned or associated with more than one group. In this example, a display device may be shared and present two or more display streams.

Each of the computing devices 201 and 202 may also include a streaming component 224 capable of communicating one or more display streams over a communication link 215. In embodiments, the streaming component 224 may be stored in memory 212 and operative and/or at least partially implemented in circuitry 210 to stream display streams. Further, a streaming component 224 operating on a source device may send a display stream and a streaming component 224 operating on a sink component may receive and process a display stream.

In embodiments, the streaming component 224 operating on a source device may communicate a display stream in accordance with a configuration performed by a configuration component 222. More specifically, the streaming component 224 operating on a source device may establish a display stream connection with one or more sink devices to communicate the display stream. In embodiments, parameter settings may be configured between a source device and one or more of the sink devices to establish a connection, for example. Configuring the parameters settings may include configuring a uniform resource locator (URL), such as "rtsp://localhost/wfd2.0" to communicate a display stream, sending a setup message to each sink device and display device to receive display streams, communicating an indication of a number of display streams being streamed, communicating a stream or video route including a stream tuple for each display stream. The stream tuple may be in the form of (display_stream_id, stream_port), where display_stream_id identifies a display stream and stream_port identifies a port (virtual or physical) of a sink device having a display device to receive a display stream. In some embodiments, such as when a display stream is being cloned on a plurality of display devices, the stream tuple may indicate more than one stream port to receive the display stream on a particular sink device. For example if two display devices connected to a same sink device is to receive a same display stream, the stream tuple may take the form (display_stream_id, stream_port_1, stream_port_2), where display_stream_id identifies a display stream, stream_port_1 identifies a first port to receive the display stream, and stream_port_2 identifies a second port to receive the display stream. Various embodiments are not limited to only identifying two ports and any number of ports may be identified.

In various embodiments, the streaming component 224 may configure and set the parameter settings using a RTSP message by communicating one or more messages between the source device and the one or more sink devices. For example, one or more RTSP_SETUP messages may be communicated between the source device and the sink device to configure the devices. In some embodiments, the messages may include one or more parameters, such as a multiple display configuration parameter, e.g. "wfd-multi-mon-setup" to configure and setup a number of display streams for communication, and the video route for each display stream using stream addresses. Various embodiments are not limited in this manner.

As previously mentioned, once a connection is established a display stream may be sent to a group of display devices and associated sink devices. More specifically, a group of display devices may be generated or created, as previously discussed above, and the display stream may be sent to each sink device coupled with at least one of the display devices in the group. The display stream may be communicated to the sink devices using broadcasting, multicasting, or multiple-unicasting transporting. In embodiments, the communication of a display stream may be controlled by the source device using one or more RTSP messages including an RSTP PLAY message, an RTSP_PAUSE message, and an RTSP_TEARDOWN message. Various embodiments are not limited in this manner.

In embodiments, the streaming component 224 may communicate the display stream using the address tuple to identify a sink device and a display device to receive each frame of the display stream. As previously discussed, the address tuple may be in the form (sink_address, display_address), where sink_address identifies a sink device to receive a frame and display_address identifies a display device coupled with the sink device to receive the frame. As mentioned, the address tuple may be assigned for each display device and sink device during the discovery operation by the discovery component 220 on the source device or by the monitoring component 226 when a new display device is added. Various embodiments are not limited in this manner and the addressing may take other forms.

The streaming component 224 may communicate more than one display stream to display devices simultaneously. As previously discussed more than one group of display devices may be generated and each group of display devices may receive a different or same display stream. A connection may be established for each display stream and each display stream may be communicated to the appropriate sink devices and display devices.

In embodiments, once a connection is established for a display stream a RTSP play message may be used to play or communicate the display stream to the display devices by the source device. When more than display device is to receive a display stream, a communication session may be established for each of the display devices. Once a session has been establish each sink device may communicate a RTSP play request to play the display stream and the source device may respond with an RTSP play response and by communicating the display stream. Each of the display devices may receive the display stream until a RTSP teardown instruction is communicated.

The computing devices 201 and 202 may include a monitoring component 226 each capable of monitoring, determining, and detecting an addition or removal of a display device. More specifically, the monitoring component 226 on a sink device may detect a display device being plugged into a port on the sink device or unplugged from a port on the sink device. The sink device may then notify the monitoring component 226 on the source device of the addition of removal of the display device. For example, the sink device may communicate with the source device via one or more RTSP messages indicating the status of each port and whether a display device is plugged into a port, has been added to a port, and/or has been removed from a port. In another example, the monitoring component 226 on the source device may "poll" or send one or more messages to the sink devices to determine the status of each port on the sink device and whether display devices have been added or removed from a sink device. In some embodiments, the monitoring component 226 on the source device may poll the sink device via an "RTSP_GET_PARAMETER" message and the monitoring component 226 on the sink device may return a status in response to the message. The status may include whether each port on a particular sink device has a connected display device or not, for example. Further, the sink device may poll the ports in a particular order which may be remembered for a later polling. The status may also indicate the order in which the ports were polled. In some embodiments, such as when a new display device has been plugged into a port on a sink device, the monitoring component 226 on the source device may also issue an RTSP monitor connectivity status message such as "wfd-monitor-connectivity-status" to determine the port number for the new display device. The status information may be passed or sent to the operating system for use during streaming. Various embodiments are not limited in this manner.

In some embodiments, the monitoring component 226 on a sink device may dynamically detect the addition or removal of a display device during streaming of a display stream and notify the monitoring component 226 on a source device via an RTSP message, for example. In the case when a display device is added to a group of display devices receiving a display stream, one or more of the components may be used to configure the newly added display device to present the display stream. For example, a configuration component 222 may be used to determine various capabilities of the new display device, and group and bind the new display device with the other display devices. For example, a relative position and location for the new display device may be determined. Further, a portion of a display scene for presentation on the new display device may be also determined. Various other adjustments may be made to dynamically add a new display device without causing interference with the display stream being presented. Once configured, the newly added display device may receive and present the display stream.

Similarly, a monitoring component 226 on the sink device may detect when a display device is removed from a group of display devices receiving a display stream and may notify the monitoring component 226 on the source device via an RTSP message, for example. The source device may cease communicating the display stream to the removed display device and configuration information may be updated without causing interference with the display stream being streamed to the remaining display devices. For example, if the removed display device was receiving a portion of a display stream operating in extended mode, the remaining display devices may be updated to compensate for the removed display device. For example, one or more of the remaining display devices may receive the portion of the display stream sent to the removed display device.

Figure 3:
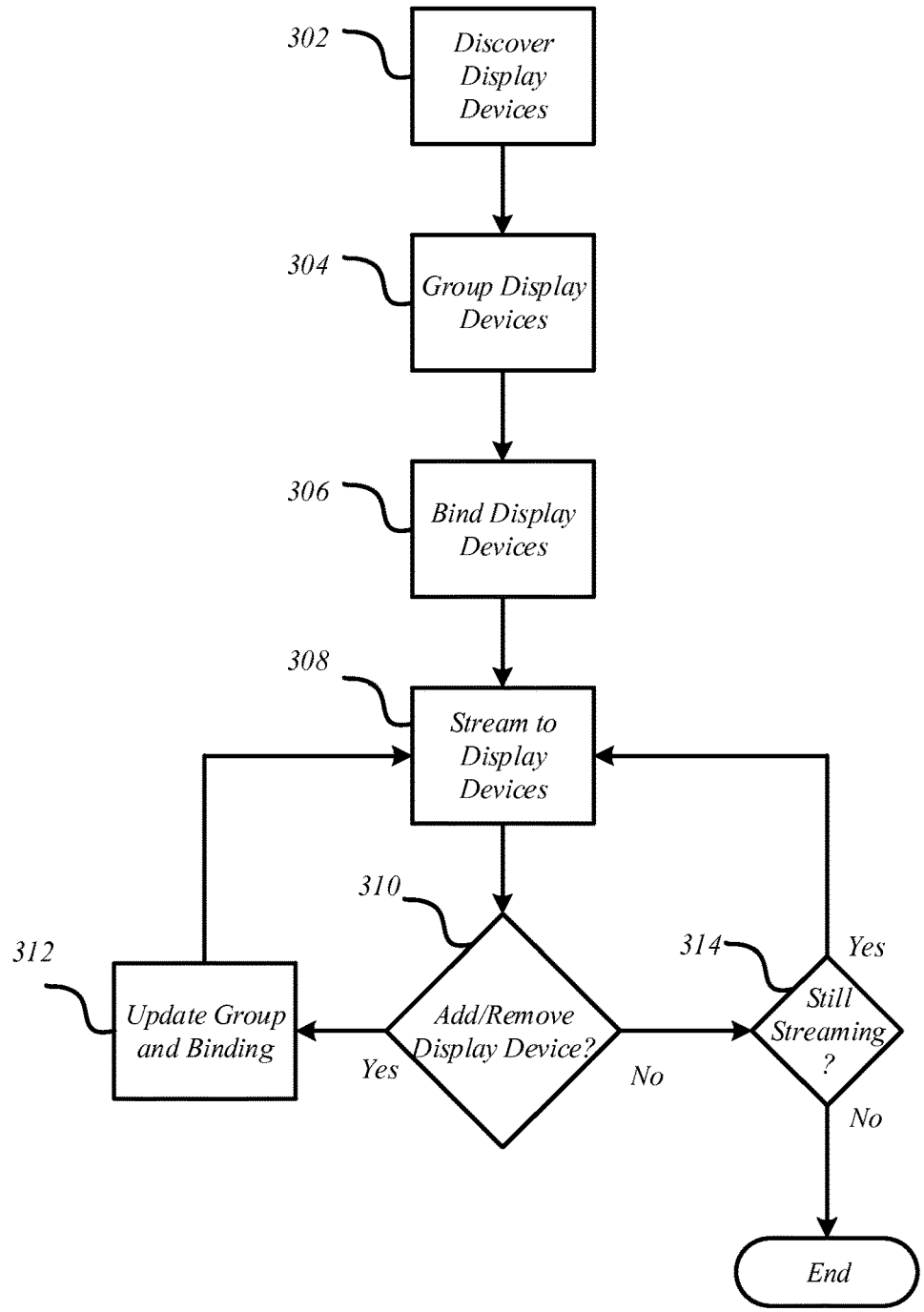
FIG. 3 illustrates an example embodiment of a first logic flow diagram.

FIG. 3 illustrates an embodiment of a first logic flow diagram 300. The logic flow 300 may be representative of some or all of the operations executed by one or more embodiments described herein. For example, the logic flow 300 may illustrate operations performed by one or more systems or devices in FIGS. 1A, 1B and 2. Various embodiments are not limited in this manner.

In various embodiments, logic flow 300 may include discovering one or more display devices at block 302. For example, various embodiments may include communicating a beacon or probe request message by a source device to detect the display devices via one or more sink devices. More specifically, each sink device in range of the source device and coupled with at least one display device may communicate a response message. The response message may indicate how many display devices are coupled with a particular sink device, an address for the sink device, and an address (or port) for each display device. In some embodiments, capability information for each display device may also be communicated to the source device in the response message or in one or more other messages. The capability information may include E-EDID data, as previously discussed above.

At block 304, one or more of the display devices discovered may be grouped into a group to receive a display stream. The display stream may include a number of display frames of display scenes to display on the display devices.

In embodiments, the display stream may be presented on the display device in a cloned mode where each display device presents the same information and/or display scene. In the same or other embodiments, the display scenes may be presented on the display devices in an extended mode where each display device presents a portion of the display scenes. In other words, display scenes may be "extended" across multiple display devices.

In some embodiments, more than one group may be generated each having a number of display devices. In this example, each of the groups may receive a different or same display stream for presentation on the display devices. Further, each of the groups may be configured differently. For example, one group may be configured to present a display stream in a cloned mode of operation and another group may be configured to present a display stream in an extended mode of operation. Various embodiments are not limited in this manner.

In some embodiments, the logic flow 300 may include binding the display devices in a group at block 306. Binding display devices may include determining sink devices associated with the display devices in a group and determining a relative positions for each of the display devices in a group. In addition, the relative positions of each of the display devices may be used when presenting a display scene. For example, during extended mode of operation, a portion of the display scenes may be determined for each of the display devices based on the display devices relative locations.

At block 308, the display stream may be streamed or communicated to the display devices via one or more sink devices. More specifically, a source device may communicate the stream as one or more frames to each sink device having a display device to present at least a portion of display scenes. The display stream, and in particular, each frame of a display stream may include addressing to address a particular sink device and a particular display device to present the display scenes. In some embodiments, such as when operating in cloned mode the entire display scenes may be sent to each of the display devices in group. In the same or other embodiments, such as when operating in extended mode of operation only a portion of the display scenes may be sent to each display device.

The logic flow 300 may include monitoring the sink devices and determining whether a display device has been added or removed from a group during display streaming at block 310. More specifically, a sink device may detect the addition of the display device plugged into or removed from a port on the sink device and may communicate this information to the source device. If no addition or removal is detected, a determination may be made as to whether the display stream is to continue to stream or if the display stream is being stopped at block 314. If the display stream is to continue to be streamed at block 314, the logic flow may continue at a block 308 and the display stream may be streamed. However, if the display stream is to be stopped, the logic flow 300 may end.

If at block 310 a display device is added to or removed from a group of display devices receiving a display stream, the groupings and bindings are updated at block 312. Once updated, the display stream may continue to be streamed at block 308. Various embodiments are not limited in this manner and although certain blocks are shown as occurring in a particular order various blocks may occur in a different order.

Figure 4A:
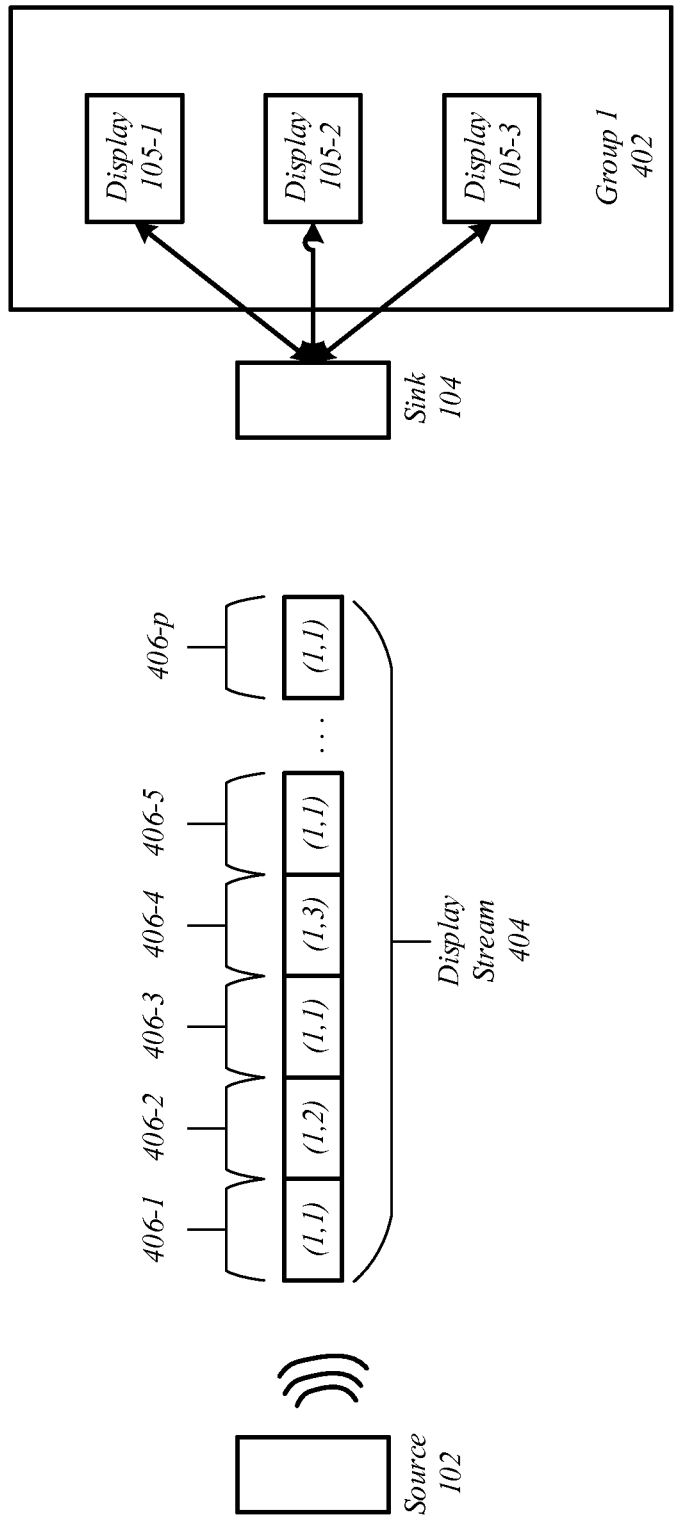
FIG. 4A illustrates an example embodiment of a fourth computing system.

FIG. 4A illustrates an example embodiment of a computing system 400 capable of communicating display streams. More specifically, FIG. 4A illustrates a source device 102 communicating a display stream 404 to a sink device 104. In this example, the sink device 104 is coupled with or connected to three display devices 105-1 through 105-3 which are grouped in a first group 402. As previously discussed, the display devices 105-1 through 105-3 may be coupled with the sink device 104 by any coupling means including an HDMI connection, a VGA connection, a USB connection, a serial connection, a parallel connection, and so forth. Various embodiments are not limited in this manner.

FIG. 4A illustrates the source device 102 communicating a single display stream 404 to a single sink device 104. However, embodiments are not limited in this manner and any number of display streams may be communicated to any number of sink devices and groups of display devices, as will be discussed in more detail below. Further and as illustrated in FIG. 4A, the display stream 404 may include any number of frames 406-1 through 406-$p$, where p may be any positive integer. The frames 406 may include display information of display scenes for presentation on the display devices 105-1 through 105-3. In some embodiments, the display information may be pixel information to present an entire or full display scenes on a display device which may include the full height and width of pixels of the display scenes.

However and in some embodiments, each of the frames may include a portion of the display scenes. More specifically, when a display stream is communicated and is to be presented in an extended mode, each frame may include pixel information to present a portion of a display scene. For example, assume display device 105-1 is in a relative position to the left of display devices 105-2 and 105-3, display device 105-2 is in the middle position of display devices 105-1 and 105-3, and display device 105-3 is to the right of display devices 105-1 and 105-2. In this example, display device 105-1 may receive frames including pixel information to present a left portion of the display scenes, display device 105-2 may receive frames including pixel information to present a middle portion of the display scenes, and display device 105-3 may receive frames including pixel information to present a right portion of the display scenes. Various embodiments are not limited to this example and various other combinations may be contemplated and considered.

The frames 406 may also include addressing information such that they are directed or sent to the correct display device 105 for presentation. As previously mentioned, a frame may include a sink address and a display address. For example, the addressing information may be a tuple in the form (sink_address, display_address), where sink_address identifies a sink device to receive a frame and display_address identifies a display device coupled with the sink device to receive the frame. The identified sink device 104 may receive the frame and direct the frame to the correct display device 105 based on the display address. For example and as illustrated in FIG. 4A, frames 406-1, 406-3, 406-5 and 406-$p$ have addressing information in the form (1, 1) and may be sent to a sink device 104 and a display device 105 associated with that particular address, such as display device 105-1 coupled with sink device 104. In another example, frame 406-2 has addressing information in the form (1, 2) and may be sent to a sink device 104 and display device 105 associated with that particular address, such as display device 105-2. In a third example, frame 406-4 has addressing information in the form (1, 3) and may be sent to a sink device 104 and display device 105 associated with that particular address, such as display device 105-3. Various embodiments are not limited to these examples.

In some embodiments, the display stream 404 may also include a stream tuple to identify the display stream and the ports on which the display stream may be sent to by the sink device 104. As previously discussed a stream tuple may be in the form of (display_stream_id, stream_port), where display_stream_id identifies the display stream 404 and stream_port identifies a port (virtual or physical) of a sink device having a display device to receive the display stream 404. As mentioned, the tuple may identify each stream port to receive the display stream.

Figure 4B:
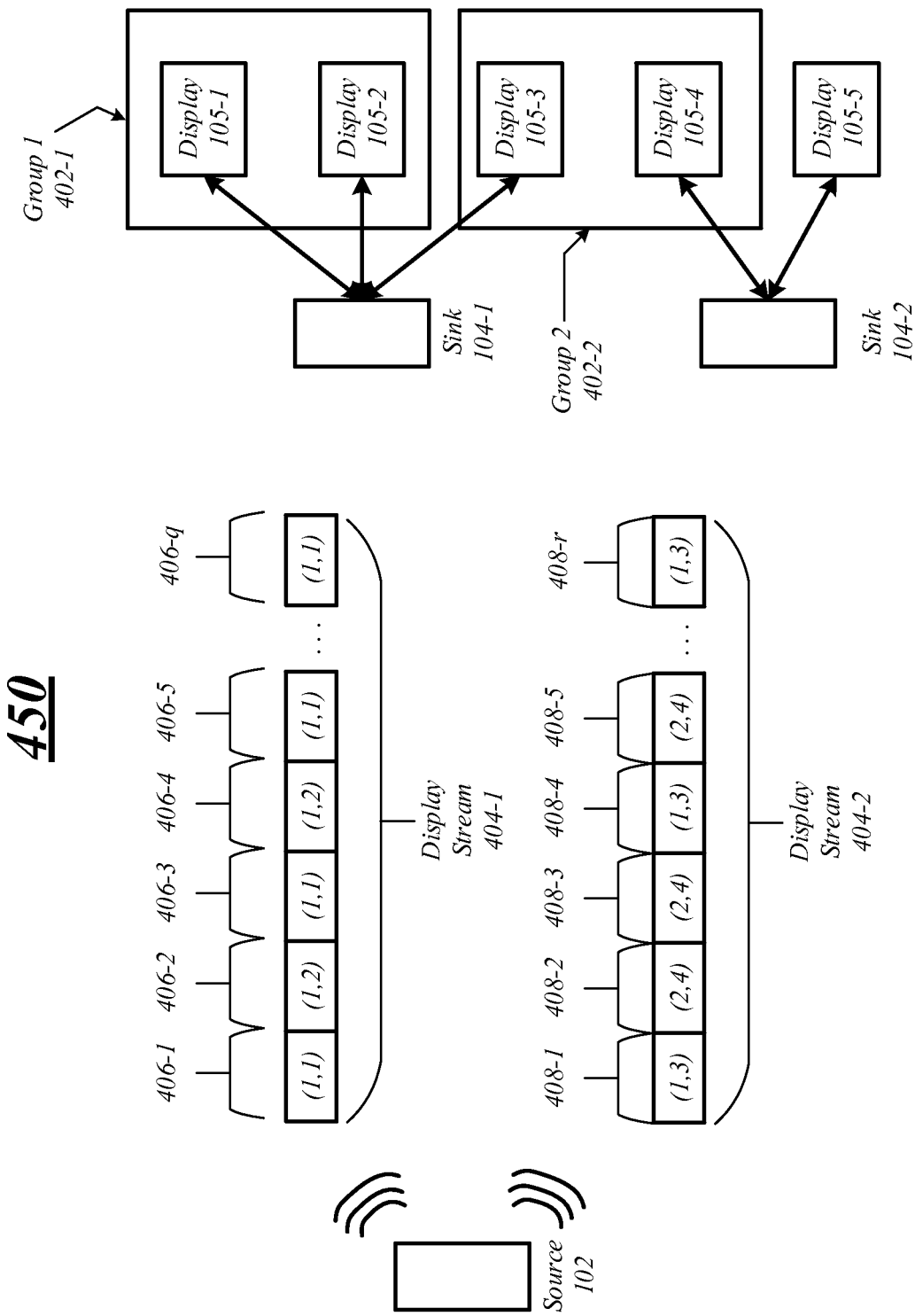
FIG. 4B illustrates an example embodiment of a fifth computing system.

FIG. 4B illustrates an example embodiment of a computing system 450 to communicate display streams. More specifically, FIG. 4B illustrates a source device 102 communicating two display streams 404-1 and 404-2 to two sink devices 104-1 and 104-2. In this example, sink device 104-1 is coupled with display devices 105-1, 105-2 and 105-3 and sink device 104-2 is coupled with display devices 105-4 and 105-5. As previously discussed, the display devices 105-1 through 105-5 may be coupled with a sink device in any manner including an HDMI connection, a VGA connection, a serial connection, a USB connection, a parallel connection, and so forth. Various embodiments are not limited to the example embodiments illustrated in FIG. 4A and/or FIG. 4B. For example, embodiments may include a source device 102 communicating any number of display streams 404 to any number of sink devices 104. Further, each of the sink devices 104 may be coupled with any number of display devices 105.

As mentioned, FIG. 4B illustrates the source device 102 communicating two display streams 404-1 and 404-2 to sink devices 104-1 and 104-2. In this example embodiment, the display devices 105 may be grouped into two groups, a first group 402-1 and a second group 402-2. The first group 402-1 may include display devices 105-1, 105-2 and the second group 402-2 may include display devices 105-3 and 105-4. Further display device 105-5 may not be in either group. In addition, the first group 402-1 may receive the first display stream 404-1 and the second group 404-2 may receive the second display stream 404-2. The first display stream 404-1 may include frames 406-1 through 406-$q$, where q may be any positive integer. Further, the second display stream 404-2 may include frames 408-1 through 408-$r$, where r may be any positive integer. However, various embodiments are not limited to this configuration and other configurations may be contemplated.

As illustrated in FIG. 4B, each of the display streams 404-1 and 404-2 includes a number of frames 406 and 408 having addressing information such that the frames are received by the appropriate sink devices 104 and display devices 105. For example, frames 406-1, 406-3, 406-5 and 406-$q$ have addressing information in the form (1, 1) and may be received by sink device 104-1 and display device 105-1 associated with that particular address. In another example, frames 406-2, and 406-4, have addressing information in the form (1, 2) and may be received by sink device 104-1 and display device 105-2 associated with that particular address. In a third example, frames 408-1, 408-4, and 408-$r$ have addressing information in the form (1, 3) and may be received by sink device 104-1 and display device 105-3 associated with that particular address. In a fourth example, frames 408-2, 408-3, and 408-5 have addressing information in the form (2, 4) and may be received by sink device 104-2 and display device 105-4 associated with that particular address. Various embodiments are not limited in this manner.

In some embodiments, each of the display streams 404-1 and 404-2 may be associated with different display scenes, video streams, video, and so forth for presentation on the display devices 105. For example, display stream 404-1 may include frames 406 to present a video or movie stream on the display devices 105 of the first group 402-1. Further, display stream 404-2 may include frames 408 to present display scenes of a source device on the display devices 105 of the second group 404-2. Various embodiments are not limited in this manner and any combination of display streaming may be contemplated. Further, each of the display streams 404-1 and 404-2 may be presented in an extended mode of operation and/or a cloned mode of operation. Thus, the frames 406 and 408 of the display streams 404 may include pixel information to present entire display scenes or a portion of display scenes.

In some embodiments, the display stream 404 may also include a stream tuple to identify the display stream and the ports on which the display stream may be sent to by the sink device 104. As previously discussed a stream tuple may be in the form of (display_stream_id, stream_port), where display_stream_id identifies the display stream 404 and stream_port identifies a port (virtual or physical) of a sink device having a display device to receive the display stream 404. As mentioned, the tuple may identify each stream port to receive the display stream.

FIG. 5 illustrates an embodiment of a first logic flow diagram 500. The logic flow 500 may be representative of some or all of the operations executed by one or more embodiments described herein. For example, the logic flow 500 may illustrate operations performed by one or more systems or devices in FIGS. 1-4B. Various embodiments are not limited in this manner.

In various embodiments, logic flow 500 may include discovering at least one sink device and at least two or more display devices, and determining capabilities for each of the two or more display devices at block 505. For example, a source device may discover one or more sink devices by performing a discovery operation which may include sending and/or receiving one or more messages including a probe and/or beacon request, and probe and/or beacon response. Further, each of the sink devices may be coupled with or connected to one or more display devices via any type of connection or coupling. The display devices may communicate capability information to the sink device via E-EDID data in some embodiments. The E-EDID data may be included in a response message or any other type of message communicated from the sink devices to the source device.

The logic flow 500 may also include performing a configuration for the at least one sink device and the two or more display devices to present a display stream on the two or more display devices at block 510. The configuration may include grouping and binding the sink devices and display devices to receive one or more display streams. Grouping two or more display devices may include putting display devices into the same group that is to receive the same display stream, for example. Further, binding display devices may include determining relative positions of display devices within the same group such that each display device in a group is communicated correct pixel information in frames of a display stream for display scenes. Binding the display devices may also include setting other configuration and parameter settings for the display devices. Embodiments are not limited in this manner.

At block 515, the logic flow 500 may include wirelessly communicating the display stream for presentation on the two or more display devices. More specifically, a source device may send or communicate a display stream that may be received by the at least one sink device coupled with display devices. The sink device may send the display stream, and in particular, frames of the display stream to the appropriate display device for presentation.

FIG. 6 illustrates an embodiment of a computing device 605. In various embodiments, computing device 605 may be representative of a computing device or system for use with one or more embodiments described herein, such as those discussed in FIGS. 1-5.

In various embodiments, computing device 605 may be any type of computing device including a computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a computing device 605 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 605 may be implemented as a smart phone capable of executing computer applications, as well as voice communications and/or data communications. Although some embodiments may be described with a computing device 605 implemented as a smart phone by way of example, it may be appreciated that other embodiments may be implemented using other wireless mobile computing devices as well. The embodiments are not limited in this context. In some embodiments, computing device 605 may also be a navigation system, infotainment system, embedded in home appliances, etc.

As shown in FIG. 6, computing device 605 may include multiple elements. One or more elements may be implemented using one or more circuits, components, registers, processors, software subroutine modules, or any combination thereof, as desired for a given set of design or performance constraints. Although FIG. 6 shows a limited number of elements in a certain topology by way of example, it can be appreciated that more or less elements in any suitable topology may be used in computing device 605 as desired for a given implementation. The embodiments are not limited in this context.

In various embodiments, computing device 605 may include one or more processing unit(s) 602. Processing unit(s) 602 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing unit(s) 602 may be connected to and communicate with the other elements and components of the computing system via an interconnect 543, such as one or more buses, control lines, and data lines.

In one embodiment, computing device 605 may include memory 604 to couple to processing unit(s) 602. In various embodiments, the memory 604 may store data and information for use by the computing device 605.

Memory 604 may be coupled to processing unit(s) 602 via interconnect 653, or by a dedicated communications bus between processing unit(s) 602 and memory 604, as desired for a given implementation. Memory 604 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 604 can store instructions and data momentarily, temporarily, or permanently. The memory 604 may also store temporary variables or other intermediate information while the processing unit(s) 602 is executing instructions. The memory 604 is not limited to storing the above discussed data and may store any type of data.

The computing device 605 may include a transceiver 606 which includes one or more components and circuitry to transmit and receive information using radio-frequency signals. More specifically, the transceiver 606 may include circuitry to produce radio-frequency mobile radio signals which are to be sent and for processing radio-frequency mobile radio signals which have been received. To this end, the transceiver 606 may be coupled to one or more antenna 616. The transmitted or received mobile radio signals are in one or more particular frequency ranges, which are typically prescribed by the mobile radio standard(s) supported by the radio-frequency assemblies. For example, transceiver 606 may include circuitry to process information according to one or more IEEE standards, one or more peer-to-peer protocols, and so forth. Various embodiments are not limited in this manner and transceiver 606 may transmit or receive information via any standard in any frequency range with one more devices, as previously mentioned.

In various embodiments, the transceiver 606 may be used to communicate with one or more other devices or stations via one or more antennas 616. The transceiver 606 may send and receive information from the stations as one or more pockets, frames, and any other transmission structure in accordance with one or more protocols.

The computing device 605 may include input/output adapter 608. Examples of I/O adapter 608 may include Universal Serial Bus (USB) ports/adapters, IEEE 1394 Firewire ports/adapters, and so forth. The embodiments are not limited in this context.

For example, an I/O adapter 608 may also include an input device or sensor, such as one or more buttons, a keyboard, a keypad, a touchscreen display, a touch sensitive device, a microphone, a biometric finger printer reader, biometric eye scanner or any other device used for inputting information into computing device 605. Moreover, the I/O adapter 608 may be a sensor including any hardware or logic to detect one or more touches or inputs on or near a housing of the apparatus, a display of the apparatus including a touchscreen or touch sensitive display.

In various embodiments, the I/O adapter 608 may include one or more components to output information to a user. For example, the I/O adapter 608 may include a speaker to output an audible noise or a haptic feedback device to output a vibration. The I/O adapter 608 may be located any within or on computing device 605, or may be separate and connected to the computing device 605 via a wired or wireless connection.

The computing device 605 may also include a display 610. Display 610 may constitute any display device capable of displaying information received from processor units 602, such as liquid crystal display (LCD), cathode ray tube (CRT) display, a projector, and so forth. Various embodiments are not limited in this manner.

The computing device 605 may also include storage 612. Storage 612 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 612 may include technology to increase the storage performance enhanced protection for valuable digital media when multiple hard drives are included, for example. Further examples of storage 612 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Figure 7:
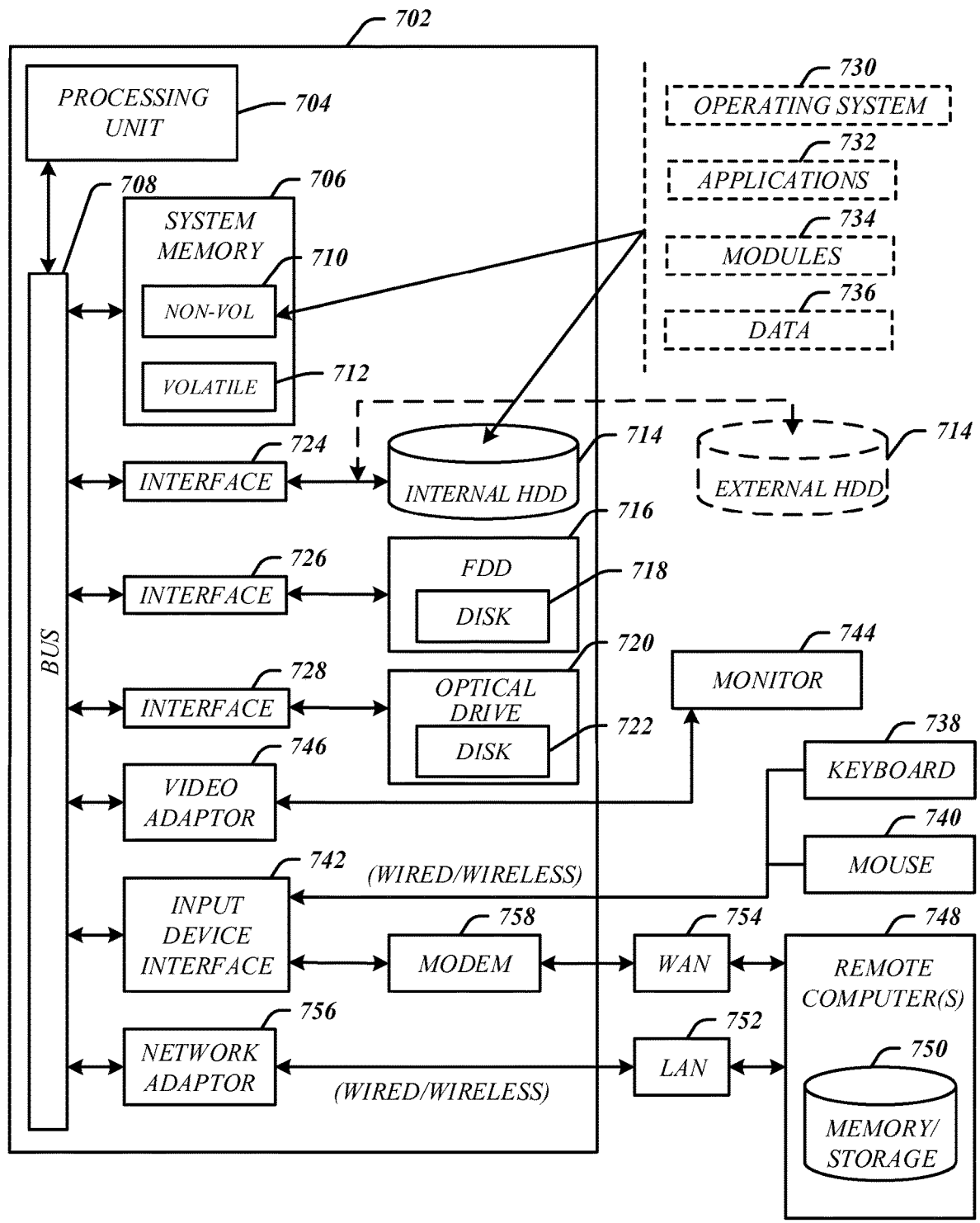
FIG. 7 illustrates an example embodiment of a computing architecture.

FIG. 7 illustrates an embodiment of an exemplary computing architecture 700 suitable for implementing various embodiments as previously described. In one embodiment, the computing architecture 700 may include or be implemented as part of system 105.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the devices in FIGS. 1-6.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 702.11x (a, b, g, n, etc.) to provide secure, reliable, fast wireless connectivity. A Wi-Fi network can be used to connect computers to each other, to the Internet, and to wire networks (which use IEEE 702.3-related media and functions).

The various elements of the system and devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, controller, an apparatus, a source device, or a sink device may include circuitry, a discovery component operative on the circuitry to discover at least one sink device and at least two or more display devices, and determine capabilities for each of the two or more display devices, a configuration component operative on the circuitry to perform a configuration for the at least one sink device and the two or more display devices to present a display stream on the two or more display devices, and a streaming component operative on the circuitry to communicate the display stream via a wireless interface for presentation on the two or more display devices.

In a second example and in furtherance of the first example, a system, device, controller, an apparatus, a source device, or a sink device may include the discovery component to discover at least two sink devices each coupled with at least one of the two or more display devices, and the streaming component to communicate the display stream to the at least two sink devices to present on the two or more display devices.

In a third example and in furtherance of any of the previous examples, a system, device, controller, an apparatus, a source device, or a sink device may include the discovery component to determine the capabilities for each of the two or more display devices in enhanced extended display identification data (E-EDID) communicated by the wireless interface, the capabilities comprising at least one of a display device type, display device identification, a filter type, timing support, a display size, luminance data, and pixel mapping.

In a fourth example and in furtherance of any of the previous examples, a system, device, controller, an apparatus, a source device, or a sink device may include the configuration component to perform the configuration comprising generating a group having at least two of the two or more display devices to present the display stream, and the streaming component to communicate the display stream to the group.

In a fifth example and in furtherance of any of the previous examples, a system, device, controller, an apparatus, a source device, or a sink device may include the configuration component to perform the configuration comprising generating at least two groups each having at least two display devices, and the streaming component to communicate the display stream to one of the two or more groups and at least one other display stream to a different one of the two or more groups.

In a sixth example and in furtherance of any of the previous examples, a system, device, controller, an apparatus, a source device, or a sink device may include the configuration component to perform the configuration comprising binding the two or more display devices to determine relative positions between each of the two or more display devices.

In a seventh example and in furtherance of any of the previous examples, a system, device, controller, an apparatus, a source device, or a sink device may include the streaming component to communicate the display stream comprising one or more frames, each of the one or more frames communicated to a particular display device based on a sink address and a display device address.

In an eighth example and in furtherance of any of the previous examples, a system, device, controller, an apparatus, a source device, or a sink device may include a monitoring component operative on the circuitry to determine that a display device has been added or removed from a group of two or more display devices, and the streaming component to communicate the display stream to the display device if the display device has been added to the group or cease communicating the display stream to the display device if the display device has been removed from the group.

In a ninth example and in furtherance of any of the previous examples, a system, device, controller, an apparatus, a source device, or a sink device may include the wireless interface to communicate display streams and information; and memory, the wireless interface and the memory coupled with the circuitry.

In a tenth example and in furtherance of any of the previous examples, an article of manufacture comprising a storage medium containing instructions that when executed cause processing circuitry to discover at least one sink device and at least two or more display devices, and determine capabilities for each of the two or more display devices, perform a configuration for the at least one sink device and the two or more display devices to present a display stream on the two or more display devices, and wirelessly communicate the display stream for presentation on the two or more display devices.

In an eleventh example and in furtherance of any of the previous examples, an article of manufacture comprising a storage medium containing instructions that when executed cause processing circuitry to discover at least two sink devices each coupled with at least one of the two or more display devices, and communicate the display stream to the at least two sink devices to present on the two or more display devices.

In a twelfth example and in furtherance of any of the previous examples, an article of manufacture comprising a storage medium containing instructions that when executed cause processing circuitry to determine the capabilities for each of the two or more display devices in enhanced extended display identification data (E-EDID), the capabilities comprising at least one of a display device type, display device identification, a filter type, timing support, a display size, luminance data, and pixel mapping.

In a thirteenth example and in furtherance of any of the previous examples, an article of manufacture comprising a storage medium containing instructions that when executed cause processing circuitry to perform the configuration comprising generating a group having at least two of the two or more display devices to present the display stream, and communicate the display stream to the group.

In a fourteenth example and in furtherance of any of the previous examples, an article of manufacture comprising a storage medium containing instructions that when executed cause processing circuitry to perform the configuration comprising generating at least two groups each having at least two display devices, and communicate the display stream to one of the two or more groups and at least one other display stream to a different one of the two or more groups.

In a fifteenth example and in furtherance of any of the previous examples, an article of manufacture comprising a storage medium containing instructions that when executed cause processing circuitry to perform the configuration comprising binding at least two or more display devices to determine relative positions between each of the two or more display devices.

In a sixteenth example and in furtherance of any of the previous examples, an article of manufacture comprising a storage medium containing instructions that when executed cause processing circuitry to communicate the display stream comprising one or more frames, each of the one or more frames communicated to a particular display device based on a sink address and a display device address.

In a seventeenth example and in furtherance of any of the previous examples, an article of manufacture comprising a storage medium containing instructions that when executed cause processing circuitry to determine that a display device has been added to a group of two or more display devices, and communicate the display stream to the display device.

In an eighteenth example and in furtherance of any of the previous examples, an article of manufacture comprising a storage medium containing instructions that when executed cause processing circuitry to determine that a display device has been removed from a group of two or more display devices, and cease communicating the display stream to the display device.

In a nineteenth example and in furtherance of any of the previous examples, a method may include discovering, by processing circuitry, at least one sink device and at least two or more display devices, and determine capabilities for each of the two or more display devices, performing, by the processing circuitry, a configuration for the at least one sink device and the two or more display devices to present a display stream on the two or more display devices, and wirelessly communicating, by the processing circuitry, the display stream for presentation on the two or more display devices.

In a twentieth example and in furtherance of any of the previous examples, a method may include discovering at least two sink devices each coupled with at least one of the two or more display devices, and communicating the display stream to the at least two sink devices to present on the two or more display devices.

In a twenty-first example and in furtherance of any of the previous examples, a method may include performing the configuration comprising generating a group having at least two of the two or more display devices to present the display stream, and communicating the display stream to the group.

In a twenty-second example and in furtherance of any of the previous examples, a method may include performing the configuration comprising generating at least two groups each having at least two display devices, and communicating the display stream to one of the at least two groups and at least one other display stream to a different one of the at least two groups.

In a twenty-third example and in furtherance of any of the previous examples, a method may include performing the configuration comprising binding at least two or more display devices to determine relative positions between each of the two or more display devices.

In a twenty-fourth example and in furtherance of any of the previous examples, a method may include communicating the display stream comprising one or more frames, each of the one or more frames communicated to a particular display device based on a sink address and a display device address.

In a twenty-fifth example and in furtherance of any of the previous examples, a method may include determining whether a display device has been added to or removed from a group of two or more display devices, and communicating the display stream to an added display device, or cease communicating the display stream to a removed display device.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   circuitry; and
   memory coupled to the circuitry, the memory comprising instructions that when executed by the circuitry, cause the circuitry to:
   discover a first sink device and at least two or more display devices coupled to the first sink device, the first sink device configured to transmit display information to the two or more display devices;
   discover capabilities for each of the two or more display devices;
   generate a group having at least two of the two or more display devices based on the discovered capabilities for each of the two or more display devices;
   configure the first sink device to present a display stream to the at least two of the two or more display devices of the group, the display stream to be presented in accordance with the discovered capabilities;
   configure a display resolution of the two or more display devices of the group based on the discovered capabilities; and
   communicate, via a wireless interface, the display stream to the first sink device for presentation of the display stream on the at least two of the two or more display devices of the group by the first sink device, the display stream comprising one or more frames, each of the one or more frames communicated to a particular display device based on a sink address and a display device address.

2. The apparatus of claim 1, the memory further comprising instructions that when executed by the circuitry, cause the circuitry to:
   discover a second sink device, the second sink device coupled with at least one additional display device, and
   communicate the display stream to the second sink device to present on the at least one additional display device.

3. The apparatus of claim 1, the memory further comprising instructions that when executed by the circuitry, cause the circuitry to determine the capabilities for each of the two or more display devices in enhanced extended display identification data (E-EDID) communicated by the wireless interface, the capabilities comprising at least one of a display device type, display device identification, a filter type, timing support, a display size, luminance data, and pixel mapping.

4. The apparatus of claim 1, the memory further comprising instructions that when executed by the circuitry, cause the circuitry to:
   perform the configuration comprising generating at least two groups each having at least two display devices, and
   communicate the display stream to one of the two or more groups and at least one other display stream to a different one of the two or more groups.

5. The apparatus of claim 1, the memory further comprising instructions that when executed by the circuitry, cause the circuitry to perform the configuration comprising binding the two or more display devices to determine relative positions between each of the two or more display devices.

6. The apparatus of claim 1, the memory further comprising instructions that when executed by the circuitry, cause the circuitry to:
   determine that a display device has been added or removed from a group of two or more display devices, and
   communicate the display stream to the display device if the display device has been added to the group or cease communicating the display stream to the display device if the display device has been removed from the group.

7. The apparatus of claim 1, comprising the wireless interface, the wireless interface coupled with the circuitry.

8. An article of manufacture comprising a storage medium containing instructions that when executed cause processing circuitry to:
   discover a first sink device and at least two or more display devices coupled to the first sink device, the first sink device configured to transmit display information to the two or more display devices;
   discover capabilities for each of the two or more display devices;
   determine a configuration for the first sink device and the two or more display devices based upon the discovered capabilities;
   generate a group having at least two of the two or more display devices to present a display stream, the configuration useable to present the display stream on the two or more display devices of the group by the sink device;
   configure a display resolution of the two or more display devices of the group based on the discovered capabilities; and
   wirelessly communicate the display stream to the first sink device in accordance with the configuration for presentation on the at least two of the two or more display devices of the group by the first sink device, the display stream comprising one or more frames, each of the one or more frames communicated to a particular display device based on a sink address and a display device address.

9. The article of manufacture of claim 8, comprising instructions that when executed cause the processing circuitry to:
   discover a second sink device, the second sink device coupled with at least one additional display device; and
   communicate the display stream to the second sink device to present on the at least one additional display device.

10. The article of manufacture of claim 8, comprising instructions that when executed cause the processing circuitry to:
    determine the capabilities for each of the two or more display devices in enhanced extended display identification data (E-EDID), the capabilities comprising at least one of a display device type, display device identification, a filter type, timing support, a display size, luminance data, and pixel mapping.

11. The article of manufacture of claim 8, comprising instructions that when executed cause the processing circuitry to:

perform the configuration comprising generating at least two groups each having at least two display devices; and communicate the display stream to one of the two or more groups and at least one other display stream to a different one of the two or more groups.

12. The article of manufacture of claim 8, comprising instructions that when executed cause the processing circuitry to:

perform the configuration comprising binding at least two or more display devices to determine relative positions between each of the two or more display devices.

13. The article of manufacture of claim 8, comprising instructions that when executed cause the processing circuitry to:

determine that a display device has been added to a group of two or more display devices; and communicate the display stream to the display device.

14. The article of manufacture of claim 8, comprising instructions that when executed cause the processing circuitry to:

determine that a display device has been removed from a group of two or more display devices; and cease communicating the display stream to the display device.

15. A computer-implemented method, comprising:

discovering, by processing circuitry, a first sink device and at least two or more display devices coupled to the first sink device, the first sink device configured to transmit display information to the two or more display devices;

discovering capabilities for each of the two or more display devices;

determining, by the processing circuitry, a configuration for the first sink device and the two or more display devices, the configuration based upon the discovered capabilities and used to present a display stream to the two or more display devices by the sink device; and generating, by the processing circuitry, a group having at least two of the two or more display devices to present the display stream;

configure a display resolution of the two or more display devices of the group based on the discovered capabilities; and wirelessly communicating, by the processing circuitry via a wireless display interconnect, the display stream to the first sink device in accordance with the configuration for presentation on the at least two of the two or more display devices of the group, the display stream comprising one or more frames, each of the one or more frames communicated to a particular display device based on a sink address and a display device address.

16. The computer-implemented method of claim 15, comprising:

discovering a second sink device coupled with at least one additional display device; and communicating the display stream to the second sink device to present on the at least one additional display device.

17. The computer-implemented method of claim 15, comprising:

performing the configuration comprising generating at least two groups each having at least two display devices; and communicating the display stream to one of the at least two groups and at least one other display stream to a different one of the at least two groups.

18. The computer-implemented method of claim 15, comprising:

performing the configuration comprising binding at least two or more display devices to determine relative positions between each of the two or more display devices.

19. The computer-implemented method of claim 15, comprising:

determining whether a display device has been added to or removed from a group of two or more display devices; and communicating the display stream to an added display device; or cease communicating the display stream to a removed display device.

\* \* \* \* \*